United States Patent
Shin et al.

(10) Patent No.: US 10,303,179 B2
(45) Date of Patent: May 28, 2019

(54) MOVING ROBOT AND METHOD OF RECOGNIZING LOCATION OF A MOVING ROBOT

(71) Applicant: LG ELECTRONICS INC., Seoul (KR)

(72) Inventors: Yongmin Shin, Seoul (KR); Kyungmin Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 412 days.

(21) Appl. No.: 15/093,974

(22) Filed: Apr. 8, 2016

(65) Prior Publication Data

US 2016/0299508 A1    Oct. 13, 2016

(30) Foreign Application Priority Data

Apr. 8, 2015  (KR) .......................... 10-2015-0049606

(51) Int. Cl.
| | |
|---|---|
| *G05D 1/00* | (2006.01) |
| *G05D 1/02* | (2006.01) |
| *B25J 13/08* | (2006.01) |
| *B25J 19/02* | (2006.01) |

(Continued)

(52) U.S. Cl.
CPC ............ *G05D 1/0231* (2013.01); *B25J 13/08* (2013.01); *B25J 19/021* (2013.01); *G05D 1/0088* (2013.01); *G05D 1/027* (2013.01); *G05D 1/0219* (2013.01); *G05D 1/0242* (2013.01); *G05D 1/0246* (2013.01); *G05D 1/0251* (2013.01); *G05D 1/0253* (2013.01); *G05D 1/0255* (2013.01); *G05D 1/0272* (2013.01); *G05D 1/0274* (2013.01); *G06K 9/00664* (2013.01);
(Continued)

(58) Field of Classification Search
None
See application file for complete search history.

(56) References Cited

U.S. PATENT DOCUMENTS

| | | | | |
|---|---|---|---|---|
| 4,933,864 A | * | 6/1990 | Evans, Jr. ................. | G01S 5/16 180/167 |
| 5,032,775 A | * | 7/1991 | Mizuno ................... | B08B 3/024 15/319 |
| 6,732,826 B2 | | 5/2004 | Song et al. | |

(Continued)

FOREIGN PATENT DOCUMENTS

| | | |
|---|---|---|
| CN | 1381340 A | 11/2002 |
| EP | 2 450 762 | 5/2012 |

(Continued)

OTHER PUBLICATIONS

European Search Report dated Aug. 9, 2016 issued in Application Serial No. 16160076.2.

(Continued)

*Primary Examiner* — Jonathan M Dager
(74) *Attorney, Agent, or Firm* — KED & Associates, LLP (57) ABSTRACT

A moving robot may include a first location recognition module configured to extract a straight line in a driving process and recognize a location using the extracted straight line and a second location recognition module configured to confirm the recognized location by reflecting the location recognized by the first location recognition module based on the image information obtained from the surroundings by way of an image capturing device.

12 Claims, 4 Drawing Sheets

(51) Int. Cl.
*G06K 9/00* (2006.01)
*G06T 7/73* (2017.01)
(52) U.S. Cl.
CPC ...... *G06T 7/73* (2017.01); *G06T 2207/30252* (2013.01)

(56) References Cited

U.S. PATENT DOCUMENTS

| | | | | |
|---|---|---|---|---|
| 7,720,554 B2* | 5/2010 | DiBernardo | G01S 5/163 | 356/139.03 |
| 8,712,588 B2* | 4/2014 | Myeong | G05D 1/0255 | 700/255 |
| 8,781,164 B2* | 7/2014 | Lee | G05D 1/0246 | 382/103 |
| 8,788,133 B2* | 7/2014 | Hung | A47L 11/4011 | 134/18 |
| 8,873,832 B2* | 10/2014 | Shin | B25J 9/162 | 382/153 |
| 8,938,319 B2* | 1/2015 | Park | G05D 1/0246 | 700/248 |
| 8,954,191 B2* | 2/2015 | Yi | G05D 1/0246 | 318/568.11 |
| 8,983,661 B2* | 3/2015 | Cho | A47L 9/2805 | 15/319 |
| 9,081,384 B2* | 7/2015 | Song | G05D 1/0223 | |
| 9,274,526 B2* | 3/2016 | Murai | G01C 21/20 | |
| 9,310,807 B2* | 4/2016 | Lee | G01C 21/32 | |
| 9,442,177 B2* | 9/2016 | Lin | G01S 5/02 | |
| 9,527,212 B2* | 12/2016 | Artes | G05D 1/0274 | |
| 9,939,529 B2* | 4/2018 | Haegermarck | G01S 17/023 | |
| 9,946,263 B2* | 4/2018 | Lindhe | G05D 1/0248 | |
| 2003/0204382 A1* | 10/2003 | Julier | G06F 17/18 | 702/196 |
| 2004/0158354 A1* | 8/2004 | Lee | G05D 1/0225 | 700/245 |
| 2004/0167670 A1* | 8/2004 | Goncalves | G01C 21/12 | 700/259 |
| 2005/0010331 A1* | 1/2005 | Taylor | G05D 1/0219 | 700/245 |
| 2005/0049788 A1* | 3/2005 | Haider | G06K 9/209 | 701/301 |
| 2005/0182518 A1* | 8/2005 | Karlsson | G05D 1/0246 | 700/253 |
| 2005/0273967 A1* | 12/2005 | Taylor | A47L 5/28 | 15/319 |
| 2006/0020369 A1* | 1/2006 | Taylor | A47L 9/009 | 700/245 |
| 2006/0064202 A1* | 3/2006 | Gutmann | G05D 1/0221 | 700/245 |
| 2007/0118248 A1* | 5/2007 | Lee | G05D 1/0225 | 700/245 |
| 2007/0239315 A1* | 10/2007 | Sato | B25J 9/1612 | 700/245 |
| 2007/0290828 A1* | 12/2007 | Choi | G05D 1/027 | 340/463 |
| 2008/0065267 A1* | 3/2008 | Hong | B25J 9/0003 | 700/245 |
| 2008/0119961 A1* | 5/2008 | Myeong | G05D 1/0272 | 700/262 |
| 2008/0154429 A1* | 6/2008 | Lee | G05D 1/027 | 700/258 |
| 2008/0184518 A1* | 8/2008 | Taylor | A47L 9/009 | 15/319 |
| 2008/0273791 A1* | 11/2008 | Lee | G06K 9/00771 | 382/153 |
| 2009/0024251 A1* | 1/2009 | Myeong | G05D 1/0246 | 700/259 |
| 2009/0149994 A1* | 6/2009 | Kim | G05D 1/0274 | 700/258 |
| 2009/0154791 A1* | 6/2009 | Yoon | G06K 9/00664 | 382/153 |
| 2009/0226113 A1* | 9/2009 | Matsumoto | G06K 9/00691 | 382/284 |
| 2009/0281661 A1* | 11/2009 | Dooley | A47L 11/4036 | 700/258 |
| 2010/0070078 A1* | 3/2010 | Kong | G05D 1/0274 | 700/259 |
| 2011/0202175 A1* | 8/2011 | Romanov | A47L 11/4011 | 700/250 |
| 2012/0191287 A1* | 7/2012 | Shin | G05D 1/027 | 701/28 |
| 2013/0138247 A1* | 5/2013 | Gutmann | G05D 1/0231 | 700/253 |
| 2013/0325244 A1* | 12/2013 | Wang | G05D 1/028 | 701/26 |
| 2014/0005933 A1* | 1/2014 | Fong | G05D 1/0274 | 701/447 |
| 2014/0032033 A1* | 1/2014 | Einecke | A01D 34/008 | 701/24 |
| 2014/0129027 A1* | 5/2014 | Schnittman | G05D 1/0219 | 700/253 |
| 2014/0207282 A1* | 7/2014 | Angle | H04L 12/282 | 700/257 |
| 2014/0214205 A1* | 7/2014 | Kwon | A47L 9/2826 | 700/258 |
| 2014/0236414 A1* | 8/2014 | Droz | G08G 1/161 | 701/28 |
| 2015/0046018 A1* | 2/2015 | Hayashi | G05D 1/0088 | 701/26 |
| 2015/0289743 A1* | 10/2015 | Taoka | A47L 9/19 | 15/319 |
| 2016/0167226 A1* | 6/2016 | Schnittman | B25J 5/00 | 382/153 |
| 2016/0271795 A1* | 9/2016 | Vicenti | B25J 9/163 | |
| 2016/0306359 A1* | 10/2016 | Lindhe | G05D 1/0221 | |
| 2017/0074652 A1* | 3/2017 | Send | G01J 3/513 | |
| 2017/0147003 A1* | 5/2017 | Karlsson | G01C 21/12 | |
| 2017/0201617 A1* | 7/2017 | So | H04Q 9/00 | |
| 2017/0223337 A1* | 8/2017 | Sung | H04N 13/243 | |
| 2017/0329333 A1* | 11/2017 | Passot | A47L 11/4011 | |
| 2017/0361468 A1* | 12/2017 | Cheuvront | A47L 9/2805 | |
| 2017/0364090 A1* | 12/2017 | Grufman | G05D 1/0214 | |
| 2018/0017679 A1* | 1/2018 | Valouch | A63F 13/213 | |
| 2018/0120116 A1* | 5/2018 | Rombouts | G01C 21/32 | |

FOREIGN PATENT DOCUMENTS

| | | |
|---|---|---|
| KR | 10-2009-0121092 | 11/2009 |
| KR | 10-2011-0085500 | 7/2011 |
| KR | 10-2013-0042389 | 4/2013 |
| KR | 10-1303161 | 9/2013 |
| KR | 10-1305405 B1 | 9/2013 |

OTHER PUBLICATIONS

Korean Office Action dated Jun. 22, 2016.
Chinese Office Action dated Jun. 21, 2018.

* cited by examiner

MOVING ROBOT AND METHOD OF RECOGNIZING LOCATION OF A MOVING ROBOT

CROSS-REFERENCE TO RELATED APPLICATION(S)

The present application claims priority under 35 U.S.C. 119 and 35 U.S.C. 365 to Korean Patent Application No. 10-2015-0049606, filed in Korea on Apr. 8, 2015, whose entire disclosure is hereby incorporated by reference.

BACKGROUND

1. Field

The present disclosure relates to a moving robot and a method of recognizing the location of the moving robot.

2. Background

Developed for industrial uses, a robot generally has been in charge of a part of factory automation. Recently, as the application fields of robots have expanded, medical robots, aerospace robots, and the like are being developed, and a home robot that can be used in an ordinary household is being produced. A robot cleaner, which is a representative example of the home robot, may clean a predetermined area by suctioning the surrounding dust or foreign substances while moving within a predetermined area autonomously. The robot cleaner may generally have a rechargeable battery and an obstacle sensor that can avoid obstacles while moving, thereby performing cleaning while autonomously moving.

An application technology using a moving robot, particularly the robot cleaner, is being developed. A method of recognizing the location of an intelligent moving robot that recognizes land marks on lateral sides thereof is disclosed in Korean Patent Publication No. 1305405 (Publication date: Sep. 2, 2013) whose entire disclosure is hereby incorporated by reference.

In the above document, an image of a ceiling may be captured by a robot mounted with a camera facing upward, and a ceiling part of the image is separated from a wall part (lateral part) thereof. The separated images may be flattened, and then by extracting characteristics to be registered as landmarks, location recognition may be performed.

However, according to the document, since landmarks on lateral sides thereof are used, 3-dimensional (3D) virtual coordinates may be inaccurate. Also, when errors caused by wheel skids are accumulated, a location error may become extremely large. Since the location is recognized by only using a camera, it may be difficult to extract characteristics in the dark.

BRIEF DESCRIPTION OF THE DRAWINGS

Embodiments will be described in detail with reference to the following drawings in which like reference numerals refer to like elements, and wherein.

DETAILED DESCRIPTION

Figure 1:
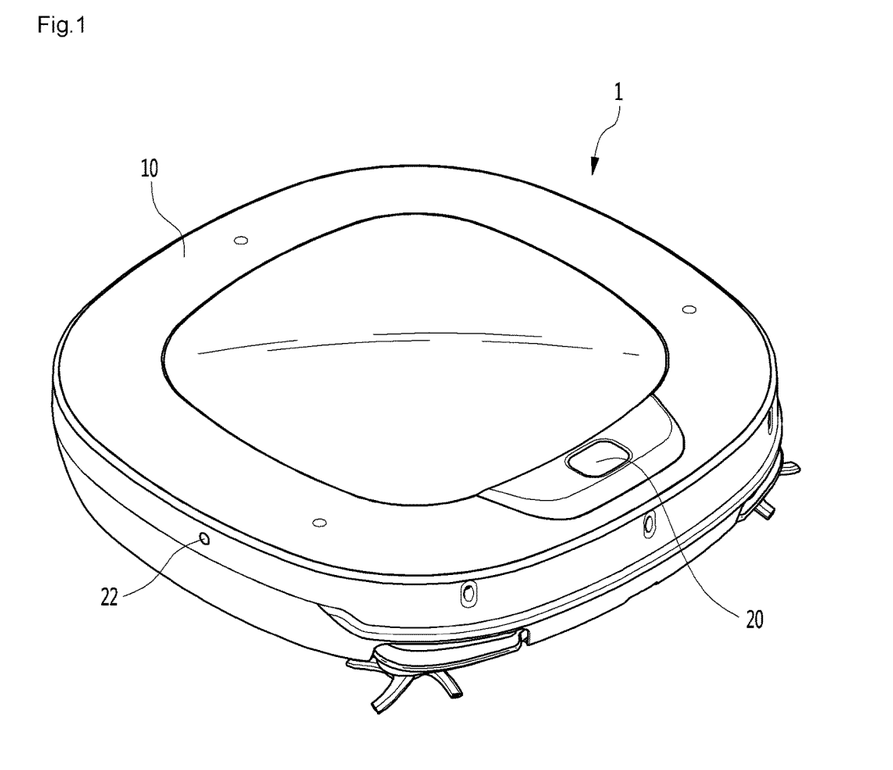
FIG. 1 is a perspective view illustrating a moving robot according to an embodiment.
Figure 2:
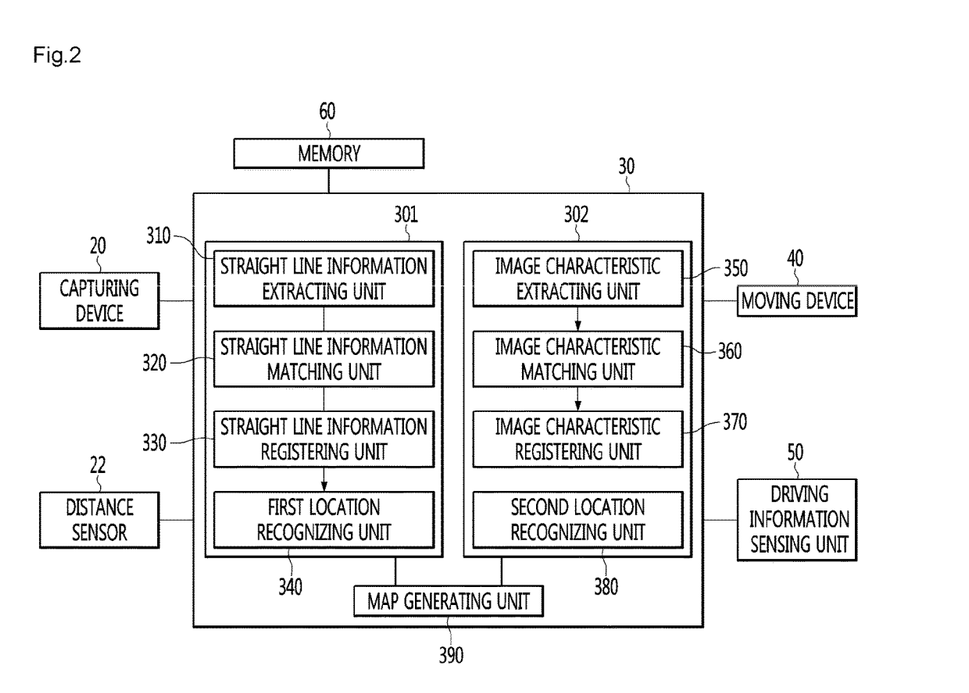
FIG. 2 is a block diagram illustrating a configuration of the moving robot according to an embodiment.

Referring to FIGS. 1 and 2, a moving robot 1 may be a robot cleaner that can clean a floor while moving autonomously. However, a technique for recognizing a location of the moving robot may be applied to various robots as well as the robot cleaner. The moving robot 1 may include a housing 10 forming an exterior. The housing 10 may include a suction motor for generating a suction force, a dust chamber for storing dust, and a part of or an entire battery for supplying power to the suction motor.

The moving robot 1 may further include a capturing device (or camera) 20 obtaining an image by capturing an image of the surroundings of the moving robot 1. Although not limited, the capturing device 20 may be arranged to face upward or forward from the housing 10. The capturing device 20 may include a lens having a wide view angle to capture an image of the entire ceiling of an area in which the moving robot 1 is positioned.

The moving robot 1 may further include a distance sensor 22 that senses a distance between the moving robot 1 and an object around the moving robot 1. The distance sensor 22 may be an infrared sensor, an ultrasonic sensor, a position sensitive device (PSD) sensor, etc. There is no limit to the type of the distance sensor 22. The distance sensor 22 may not only detect an obstacle, but also may detect an obstacle with a straight line.

The moving robot 1 may further include a moving device 40 for autonomously moving the moving robot 1. The moving device 40 may include at least one wheel and a motor for operating the at least one wheel. To easily change a direction of the moving robot 1 and easily move the moving robot 1, the moving device 40 may include a plurality of wheels and a plurality of motors for independently operating each of the plurality of wheels.

The moving robot 1 may further include a control unit (or controller) 30. The control unit 30 may control the moving device 40 to move the moving robot 1. The control unit 30 may generate a map based on the information detected by the capturing device 20 and the distance sensor 22 and recognize the current location of the moving robot 1. The moving robot 1 may further include a memory 60 for storing the information generated by the control unit 30. The memory 60 may further store control information for controlling the moving robot 1, operation history information of the moving robot 1, etc.

The moving robot 1 may further include a driving information sensing unit (or driving information sensor) 50. The driving information sensing unit 50 may include a wheel sensor. The wheel sensor may be connected to the plurality of wheels to detect the number of rotations of each of the wheels. The wheel sensor may be a rotary encoder. The rotary encoder may detect and output the number of rotations of both right and left wheels.

The control unit 30 may compute a rotation speed of each wheel using the number of rotations detected by the wheel sensor. The control unit 30 may also compute a rotation angle using a difference between the number of rotations of each of the wheels.

The driving information sensing unit 50 may further include an acceleration sensor. The acceleration sensor may detect a change in the speed of the moving robot 1, for example, a change in a movement speed caused by a start, a stop, a direction change, a collision with an obstacle, etc. The acceleration sensor may detect a wheel skid or idling. The acceleration sensor may be installed in the control unit 30 to detect a change in the speed of the moving robot. The acceleration sensor may detect an amount of impact caused by the change in speed and may output a voltage value corresponding to the amount of impact. In other words, the acceleration sensor may perform the function of an electronic bumper.

The control unit 30 may determine a change in location based on the operation information output from the driving information sensing unit 50 and may use the determined movement information to recognize a location. The control unit 30 may include a first location recognition module 301 for recognizing the location of the moving robot 1 based on the information detected by the distance sensor 22. The first location recognition module 301 may include a straight line information extracting unit (or straight line information extractor) 310 for extracting straight line information based on the information detected by the distance sensor 22.

While the moving robot 1 moves, the distance sensor 22 may periodically output results of distances to surrounding objects. The results of reference numbers (N) output from the distance sensor 22 may be continuously stored in the memory 60. The results of reference numbers (N) stored in the memory 60 may be result values showing distances from the moving robot 1 to each of the surrounding objects while the moving robot 1 moves.

The straight line information extracting unit or module 310 may draw a virtual straight line connecting an initial result value with a final result value among the results of the reference numbers (N) stored in the memory 60, calculate minimum distances between each of N−2 result values stored in the memory 60 and the obtained virtual straight line, and may determine whether the obtained straight line is actually a straight line or not. When each of the minimum distances between the N−2 points and the obtained virtual straight line is smaller than a reference distance, the straight line information extracting unit 310 may determine that the virtual straight line is actually a straight line.

While the surrounding objects may have various shapes, a wall or a piece of furniture, etc. may have a straight line. Since there is a high probability in which a location of the wall or furniture is fixed, the accuracy of location recognition may be increased when the straight line included in the wall, the piece of furniture, or the like is used for the location recognition. In the case of a space such as a room, since the wall, furniture, or the like mostly includes a straight line, the accuracy of location recognition may be ensured in the room.

The first location recognition module 301 may further include a straight line information matching unit (or straight line information matching module) 320. The straight line information matching unit 320 may determine whether the straight line extracted from the straight line information extracting unit 310 is the same as the previously extracted straight line. In this case, the previously extracted straight line may have been stored in the memory 60 in advance.

The straight line information matching unit 320, for example, may determine whether a currently extracted straight line is the same as the previously extracted straight line by calculating the Mahalanobis' distance for the extracted straight line. When the currently extracted straight line is the same as the previously extracted straight line, the straight line information matching unit 320 may match the currently extracted straight line to the previously extracted straight line to correct the location of the straight line. The correction of the location of the straight line may allow the current location of the moving robot to be corrected. When the previously extracted straight line is not present, the straight line information matching unit 320 may recognize the currently extracted straight line as a new straight line.

The first location recognition module 301 may further include a straight line information registering unit (or straight line information registry) 330. The straight line information registering unit 330 may store the straight line in the memory 60 when the extracted straight line is a new straight line and extend the existing straight line when the extracted straight line is the same as the previously extracted straight line. The first location recognition module 301 may further include a first location recognizing unit (or first location recognizing module) 340 for recognizing a location of the moving robot 1. The first location recognizing unit 340 may recognize a location of the moving robot 1 based on a straight line registered by the straight line information registering unit 330 and driving information detected by the driving information sensing unit 50.

The control unit 30 may further include a second location recognition module 302 for finally recognizing or confirming the recognized location of the moving robot 1 by reflecting a location of the moving robot initially recognized in the first location recognition module 301. The second location recognition module 302 may include an image characteristic extracting unit (or image characteristic extractor) 350. The image characteristic extracting unit 350 may extract a plurality of characteristic points by performing image-processing on the image information obtained from the capturing device 50.

The second location recognition module 302 may further include an image characteristic matching unit (or image characteristic matching module) 360. The image characteristic matching unit 360 may match the plurality of characteristic points based on information on at least two successively captured images.

The second location recognition module 302 may further include an image characteristic registering unit (or image characteristic registry) 370. A plurality of characteristics points may be shown as 3-dimensional coordinates, and the image characteristic registering unit 370 may extract characteristic lines using the characteristic points shown as the 3-dimensional coordinates and line components extracted from the image information. Since a method of extracting characteristic lines from the image information may vary depending on image-processing methods, a detailed description for the image-processing method will be omitted. The image characteristic registering unit 370 may store the extracted characteristic lines in the memory 60.

The second location recognition module 302 may further include a second location recognizing unit (or second location recognizing module) 380 for recognizing a location of the moving robot 1 based on the characteristic line extracted from the image characteristic registering unit 370. The second location recognizing unit 380 may finally determine a location by reflecting the location initially recognized by the first location recognizing unit 340.

The control unit 30 may further include a map generating unit (or map generator) 390. The map generating unit 390 may generate a map using the straight line obtained from the first location recognition module 301 and the characteristic line provided from the second location recognition module 302. When the map generating unit 390 generates the map, the first and second location recognition modules 301 and 302 may recognize the current location of the moving robot 1 on the map.

Figure 3:
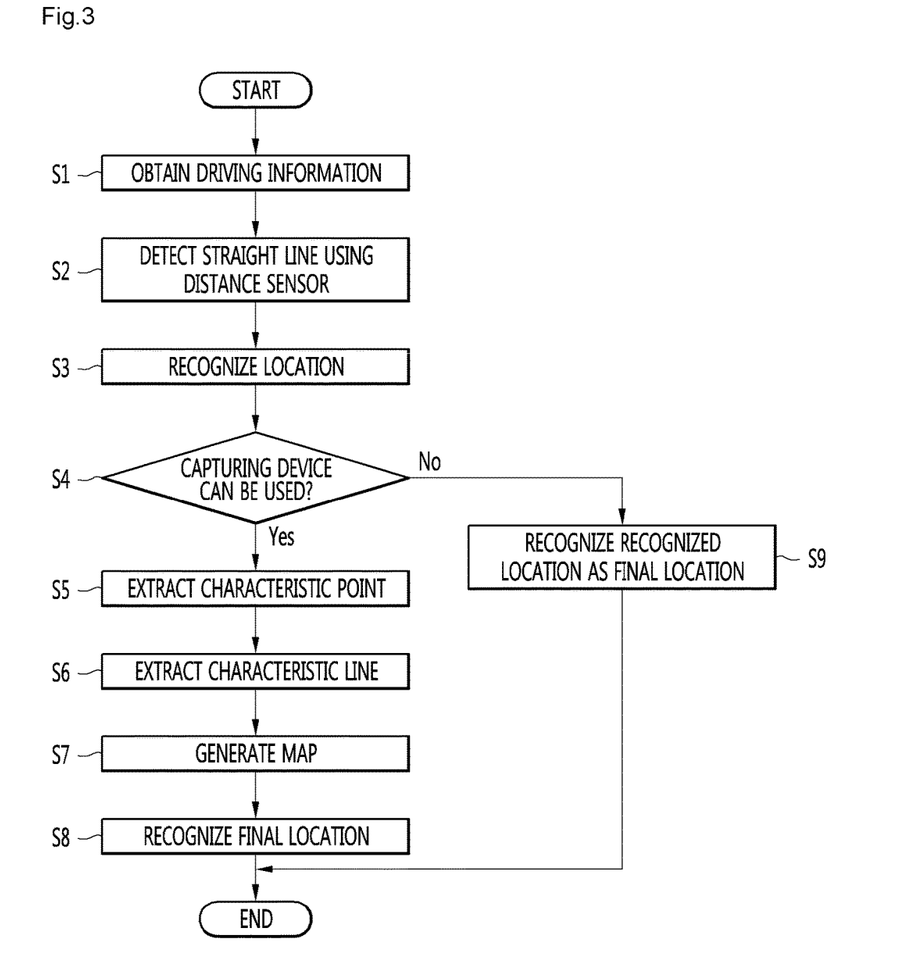
FIG. 3 is a flowchart describing a method of recognizing the location of the moving robot according to an embodiment.

Referring to FIG. 3, while the moving robot 1 is driven by the moving device 40, driving information may be obtained by the driving information sensing unit 50 (S1). While the moving robot 1 moves, the distance sensor 22 may periodically output a result value for a distance between the moving robot 1 and an object around the moving robot 1, and the first location recognition module 301 may extract a straight line based on the result value output from the distance sensor 22 (S2).

Figure 4:
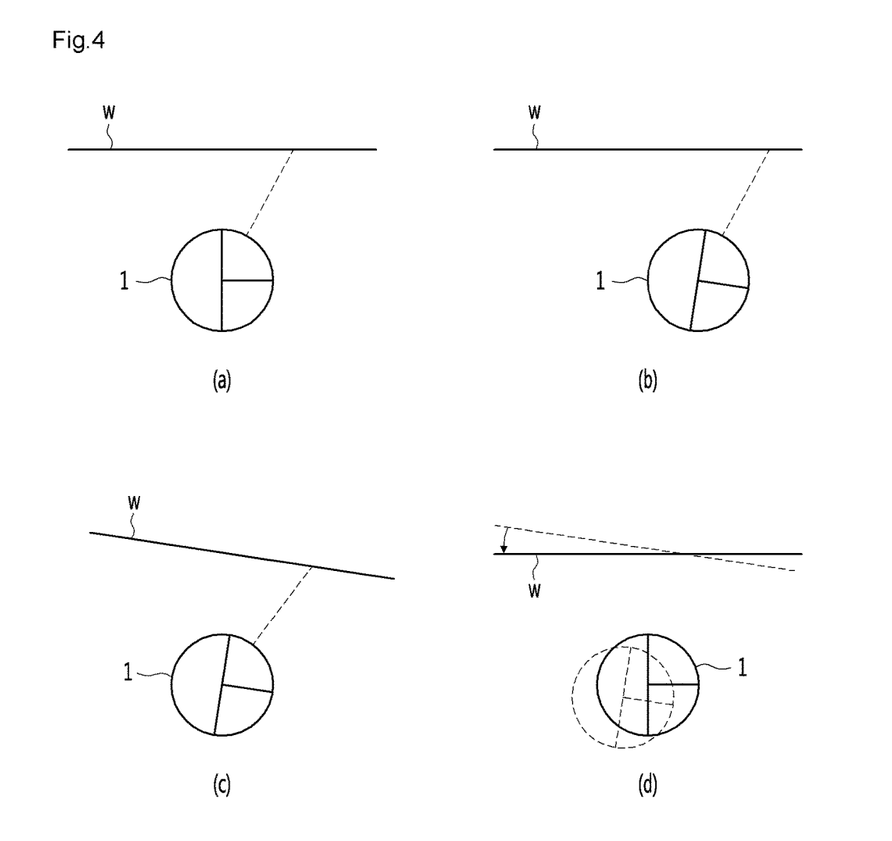
FIG. 4 illustrates a process of correcting a location and a process of moving the moving robot according to an embodiment.

The moving robot 1 may recognize its current location by using the extracted straight line and reflecting the obtained driving information (S3). As shown in FIG. 4(*a*), the moving robot 1 may drive parallel to a straight line of the wall. While the moving robot 1 moves, the moving robot 1 as shown in FIG. 4(*b*) may lose its posture due to slipping on the floor. In this case, as shown in FIG. 4(*b*), although the moving robot slips, an absolute location of the straight line of the wall may not actually be changed. However, the moving robot 1 may recognize the straight line having the shape in FIG. 4(*c*) due to the slipping of the moving robot. When the straight line is recognized in the manner above, a predicted movement direction of the moving robot 1 may be changed, and thus location recognition errors may be accumulated. Therefore, the first location recognition module 301 may accurately recognize the current location of the moving robot by correcting an angle by matching the extracted straight line with the previously extracted straight line.

After the location of the moving robot 1 is initially recognized by the first location recognition module 301, the control unit 30 may determine whether the capturing device 20 can be used (S4). The capturing device 20 can be used when the capturing device 20 is operational and an illumination level detected by an illumination level sensor is equal to or greater than a standard illumination level.

When the illumination level detected in the illumination level sensor is less than the standard illumination level, it may be difficult to recognize a location using the image information captured in the capturing device 20. Even when the illumination level detected by the illumination level sensor is equal to or greater than the standard illumination level, when the capturing device 20 is abnormal, a location may not be recognized by the capturing device 20.

As a result of the determination in the operation S4, when the capturing device 20 can be used, the second location recognition module 302 may finally recognize the location of the moving robot 1 based on the image information determined by the capturing device 20. The characteristic points may be extracted from the image information obtained from the capturing device 20 (S5), characteristic lines may be extracted using the extracted characteristic points (S6), and a final location may be recognized (S8). A map may be generated using the extracted characteristics lines (S7). When the capturing device 20 cannot be used, the first location recognition module 301 may use the initially recognized location as a final location (S9).

The method of recognizing a location by the first location recognition module may be different from the method of recognizing a location by the second location recognition module. Further, when the capturing device can be used, a location may be recognized by the second location recognition module. When the capturing device cannot be used, a location may not be recognized by the second location recognition module.

When a location can be recognized by the second location recognition module after the location recognition is initially performed using the first location recognition module, the second location recognition module may finally recognize or confirm the location by reflecting the location recognized in the first location recognition module. When a location cannot be recognized by the second location recognition module, the location initially recognized by the first location recognition module may be recognized and determined as the final location.

By having the first location recognition module which extracts straight lines and recognizes a location by performing a matching between the straight lines, location recognition error caused by slipping or losing its posture in a driving process may be minimized. Also, when the capturing device can be used, by having the second location recognition module which finally recognizes a location based on the location initially recognized by the first location recognition module, location recognition accuracy may be advantageously increased.

Even when the capturing device cannot be used, since the location recognized by the first location recognition module may be used as a final location, the location may be accurately recognized regardless of a circumstance or a condition of the capturing device. Therefore, when recognition of the location of the moving robot becomes accurate, non-cleaned area on the map may be reduced.

The moving robot may include a first location recognition module that extracts a straight line in a driving process and recognizes a location using the extracted straight line, and a second location recognition module that finally recognizes a location by reflecting the location recognized by the first location recognition module based on the image information obtained from the surroundings.

The moving robot may include a housing having a distance sensor that measures a distance to a surrounding object, a moving device moving the housing, a driving information sensing unit that senses driving information when the housing is driven by the moving device, a location recognition module recognizing a current location by reflecting the information output from the driving information sensing unit and extracting a straight line using result values output from the distance sensor, and a memory to store the straight line extracted by the location recognition module.

The method of recognizing a location of the moving robot may include recognizing a location of the moving robot using the first location recognition module, determining whether a location can be recognized using the second location recognition module, and, by the second location recognition module, finally recognizing and determining a location by reflecting the location recognized by the first location recognition module when a location can be recognized by the second location recognition module, and recognizing and determining the location recognized by the first location recognition module as a final location when a location cannot be recognized by the second location recognition module.

In the description of embodiments, terms such as first, second, A, B, (a), (b) or the like may be used herein when describing components. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot comprising:
   a controller, the controller comprising;
      a first location recognition module configured to extract a straight line of an obstacle based on information detected by a distance sensor during a driving process and recognize a location using the extracted straight line; and
      a second location recognition module configured to confirm the recognized location based on the location recognized by the first location recognition module based on image information obtained from surroundings,
   wherein the moving robot further comprises a memory configured to store the straight line extracted by the first location recognition module,
   wherein the first location recognition module includes:
      a straight line information extractor configured to extract the straight line information from values provided by the distance sensor;
      a straight line information matching module configured to determine whether the straight line extracted from the straight line information extractor is the same as the previously extracted straight line stored in the memory;
      a straight line information registry configured to register or confirm that the information regarding the straight line exists in the memory when the extracted straight line is a new straight line and extend the previously extracted straight line when the extracted straight line is the same as the previously extracted straight line; and
      a first location recognizing module configured to recognize a current location using the information registered by the straight line information registry.

2. The moving robot according to claim 1, further including a capturing device configured to obtain the image information, wherein when the capturing device is usable, the second location recognition module confirms the recognized location with the image information, and when the capturing device is unusable, the second location recognition module determines the location recognized by the first location recognition module as a final location.

3. The moving robot according to claim 2, wherein the second location recognition module includes:
   an image characteristic extractor configured to extract a plurality of characteristic points by performing image-processing on the image information obtained from the capturing device;
   an image characteristic matching module configured to match the plurality of characteristic points based on information on at least two successively captured images;
   an image characteristic registry configured to extract characteristic lines using line components extracted from the characteristic points shown as 3-dimensional coordinates and the image information and store the characteristic lines in the memory; and
   a second location recognizing module configured to recognize a location of the moving robot based on the characteristic lines extracted from the image characteristic registry.

4. The moving robot according to claim 2, further including a moving device to drive the moving robot and a driving information sensor configured to sense driving information when the moving robot is driven by the moving device, wherein the first location recognition module extracts the straight line using the result value output from the distance sensor and based on information output from the driving information sensor.

5. The moving robot according to claim 4, wherein the moving device includes at least one wheel, and the driving information sensor includes a wheel sensor configured to sense the number of rotations of the at least one wheel.

6. The moving robot according to claim 2, further including an illumination level sensor configured to sense an illumination level, wherein the capturing device is able to be used when the illumination level detected by the illumination level sensor is equal to or greater than a predetermined illumination level that allows the capturing device to capture an image.

7. A moving robot comprising:
   a housing having a distance sensor configured to measure a distance to a surrounding object;
   a moving device configured to move the housing;
   a driving information sensor configured to detect driving information when the housing is driven by the moving device; and
   a controller, the controller comprising;
      a first location recognition module configured to recognize a current location by using information output from the driving information sensor and extracting a straight line of an obstacle using a result value output from the distance sensor; and
      a memory configured to store the straight line extracted by the first location recognition module,
   wherein the first location recognition module includes:
      a straight line information extractor configured to extract the straight line information from values output from the distance sensor;
      a straight line information matching module configured to determine whether the straight line extracted from the straight light information extractor is the same as a previously extracted straight line that is stored in the memory;
      a straight line information registry configured to register or confirm that the information regarding the straight line exists in the memory when the extracted straight line is a new straight line and extend the existing straight line when the extracted straight line is the same as the previously extracted straight line; and a first location recognizing module configured to recognize the current location using the information registered by the straight line information registry.

8. The moving robot according to claim 7, further including a capturing device configured to obtain image information; and a second location recognition module configured to confirm the recognized location by reflecting the location recognized by the first location recognition module based on the image information obtained from the capturing device.

9. The moving robot according to claim 8, wherein when the capturing device is usable, the second location recognition module confirms the recognized location with the image information, and when the capturing device is unusable, the second location recognition module determines the recognized location as a final location.

10. The moving robot according to claim 7, wherein the moving device includes at least one wheel, and the driving information sensor detects a number of rotations of the at least one wheel.

11. A method of recognizing a location of a moving robot including a controller, the method comprising:
  recognizing a location of the moving robot using a first location recognition module within the controller, wherein the first location recognition module is configured to extract a straight line of an obstacle based on information detected by a distance sensor in a driving process and recognize a location using the extracted straight line;
  determining whether a location is able to be confirmed using a second location recognition module within the controller, wherein the second location recognition module is configured to confirm the recognized location by verifying the location recognized by the first location recognition module based on image information obtained from surroundings; and
  by the second location recognition module, confirming and determining a location by reflecting the location recognized by the first location recognition module when a location is able to be recognized by the second location recognition module, and recognizing and determining the location recognized by the first location recognition module as a final location when a location is not able to be recognized by the second location recognition module,
wherein the first location recognition module includes:
  a straight line information extractor configured to extract the straight line information from values output from the distance sensor;
  a straight line information matching module configured to determine whether a straight line extracted from the straight light information extractor is the same as a previously extracted straight line stored in the memory;
  a straight line information registry configured to register or confirm that the information regarding the straight line exists in the memory when the extracted straight line is a new straight line and extend the existing straight line when the extracted straight line is the same as the previously extracted straight line; and
  a first location recognizing module configured to recognize the current location using the information registered by the straight line information registry.

12. The method according to claim 11, wherein the second location recognition module recognizes a location by extracting a characteristic line from image information obtained from a capturing device.

* * * * *